(12) United States Patent
Arnold et al.

(10) Patent No.: US 7,624,761 B2
(45) Date of Patent: Dec. 1, 2009

(54) TUBE SHAPED HIGH PRESSURE STORAGE TANK

(75) Inventors: Gerd Arnold, Nauheim (DE); Ulrich Eberle, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 569 days.

(21) Appl. No.: 11/243,365

(22) Filed: Oct. 4, 2005

(65) Prior Publication Data

US 2007/0075085 A1    Apr. 5, 2007

(51) Int. Cl.
  *F16L 11/00* (2006.01)
(52) U.S. Cl. .................. 138/125; 138/137; 138/140; 128/205.22
(58) Field of Classification Search ............ 138/125, 138/126, 137, 141, 140, DIG. 1; 128/205.22; 428/36.91
  See application file for complete search history.

(56) References Cited

U.S. PATENT DOCUMENTS

| | | | | |
|---|---|---|---|---|
| 2,380,372 A | * | 7/1945 | Alderfer | 244/148 |
| 3,432,060 A | | 3/1969 | Cowley | |
| 3,491,752 A | * | 1/1970 | Cowley | 128/201.22 |
| 4,009,734 A | * | 3/1977 | Sullivan | 138/125 |
| 4,253,454 A | * | 3/1981 | Warncke | 128/202.26 |
| 4,273,160 A | | 6/1981 | Lowles | 138/124 |
| 4,932,403 A | * | 6/1990 | Scholley | 128/205.22 |
| 5,036,845 A | * | 8/1991 | Scholley | 128/205.22 |
| 5,127,399 A | * | 7/1992 | Scholley | 128/205.22 |
| 5,826,623 A | | 10/1998 | Akiyoshi et al. | 138/ 126 |
| 5,894,865 A | * | 4/1999 | Winter et al. | 138/121 |
| 5,964,409 A | | 10/1999 | Alexander et al. | 138/125 X |
| 6,047,860 A | | 4/2000 | Sanders | |
| 6,109,306 A | | 8/2000 | Kleinert | 138/127 |
| 6,237,641 B1 | | 5/2001 | Niki et al. | 138/126 |
| 6,279,615 B1 | | 8/2001 | Iio et al. | 138/137 |
| 6,360,777 B1 | | 3/2002 | Bae | 138/30 |
| 6,591,617 B2 | | 7/2003 | Wolfe | 62/46.3 |
| 6,659,303 B2 | | 12/2003 | Garceau et al. | |
| 6,688,339 B2 | | 2/2004 | Yamaguchi et al. | 138/129 |
| 6,698,211 B2 | | 3/2004 | Gustafson | 62/50.2 |
| 6,761,188 B1 | | 7/2004 | Besche et al. | 138/126 |
| 6,838,141 B2 | | 1/2005 | Ikemoto et al. | 428/36.91 |

FOREIGN PATENT DOCUMENTS

| | | |
|---|---|---|
| DE | 19818898 | 8/1999 |
| DE | 10343250 | 5/2004 |
| WO | WO 90/12982 | 11/1990 |

\* cited by examiner

*Primary Examiner*—Patrick F Brinson (57) ABSTRACT

A flexible, high pressure, tubular storage vessel for storing and dispensing a compressed gas. The vessel has a gas impermeable inner core member comprising a flexible material and defining an inner diameter of a fluid-carrying channel adapted to store the compressed gas. A flexible reinforcing material is circumferentially disposed about the inner core member. The flexible reinforcing material is surrounded by an air-tight gas barrier wrapping defining an outer diameter. The vessel is configured to be coiled or shaped having a plurality of bends. The bend areas may have a variable inner diameter and are preferably provided with additional reinforcing material.

19 Claims, 6 Drawing Sheets

TUBE SHAPED HIGH PRESSURE STORAGE TANK

FIELD OF THE INVENTION

The present invention relates to high pressure storage vessels, and more particularly, to the storage of hydrogen gas for use in a propulsion system, such as with a fuel cell or an internal combustion engine.

BACKGROUND OF THE INVENTION

Fuel cells have been proposed as a power source for electric vehicles and other applications. In proton exchange membrane (PEM) type fuel cells, hydrogen is supplied to the anode of the fuel cell and oxygen is supplied as the oxidant to the cathode. A common technique for storing large quantities of hydrogen is to cool hydrogen via liquefaction techniques and store the liquid phase hydrogen in a cryogenic storage tank. Hydrogen gas liquefies at −253° C. and ambient pressure, and can be stored at about 70g/L in the liquid phase. However, the amount of energy required to convert hydrogen gas into a liquid is very high, and currently may be as much as up to 30% of the energy obtained from using the gas as a fuel.

Conventional hydrogen storage tanks, such as cryogenic tanks used to supply hydrogen gas to a fuel cell, are commonly made of aluminum or stainless-steel alloys. The storage tanks generally consist of an inner storage vessel encapsulated with an outer vessel, or shell, commonly separated from one another with supports (characterized by their low heat conductivity). These types of tanks add excess bulk and weight to a vehicle and may be difficult to incorporate into the overall vehicle design, especially in circumstances when minimal space is available.

Conventional hydrogen storage tanks, such as High-Pressure Vessels for Compressed Gaseous Hydrogen ($CGH_2$) are commonly made of aluminum, stainless-steel alloys (particularly for low pressures applications) or Carbon-Fiber-Composites (particularly for operating pressures greater than 350 bar). Carbon-Fiber-Composite based tanks consist generally of an inner layer, or so called $H_2$ permeation barrier, a layer of carbon fiber as pressure support, and an outer protection shell (usually made of KEVLAR®, or a related material such as glass fibers). At 700 bar and room temperature, the density of hydrogen gas is about one half of the value of liquid hydrogen at 1 bar and 20 K. Additionally, $CGH_2$ at operating pressures greater than 200 bar shows deviations from the ideal gas law: The $H_2$ density no longer increases in proportion to the operating pressure. Due to the fact that conventional pressure vessels typically feature a cylindrical form, CGH2 tanks are difficult to incorporate into the overall vehicle design, especially in circumstances when minimal space is available.

Accordingly, there is a need for an improved hydrogen storage vessel. In particular, one that minimizes weight and conserves space within a motor vehicle while providing the required storage capabilities necessary for the operation of a power generating device such as a fuel cell or an internal combustion engine.

SUMMARY OF THE INVENTION

The present invention provides a flexible, high pressure, tubular storage vessel for storing and dispensing a compressed gas. The vessel has a gas impermeable inner core member comprising a flexible material and defining an inner diameter of a fluid-carrying channel adapted to store the compressed gas. A flexible reinforcing material is circumferentially disposed about the inner core member defining an outer diameter. In various embodiments, the tubular storage vessel is shaped having a plurality of bends for the ease of placement within a vehicle. Preferably the vessel is used to store hydrogen gas for use with a fuel cell.

In another embodiment, the present invention provides a tube shaped vessel adapted to store hydrogen fuel for use with a power generating device. The vessel includes a gas impermeable inner tube comprising a flexible material and defining an inner diameter of a fluid-carrying channel adapted to store the hydrogen fuel. A flexible reinforcing material is circumferentially disposed about the inner tube and defines an outer diameter. The vessel is flexible and configured to be shaped into a pattern. Preferably, the vessel has a greater amount of reinforcing material surrounding the inner tube at various bend regions. Alternatively, the vessel has a smaller inner diameter in the bend regions and the same amount of reinforcing material surrounding the inner tube.

The present invention also relates to a method of storing and providing hydrogen fuel to a power generating device. The method includes providing a flexible, high pressure, tubular storage vessel having an inner core member defining a fluid-carrying channel, and a flexible reinforcing material surrounding the inner core member. The method includes filling the tubular storage vessel with hydrogen gas to an operating pressure from about 100 to about 900 bar, and selectively releasing hydrogen to the power generating device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
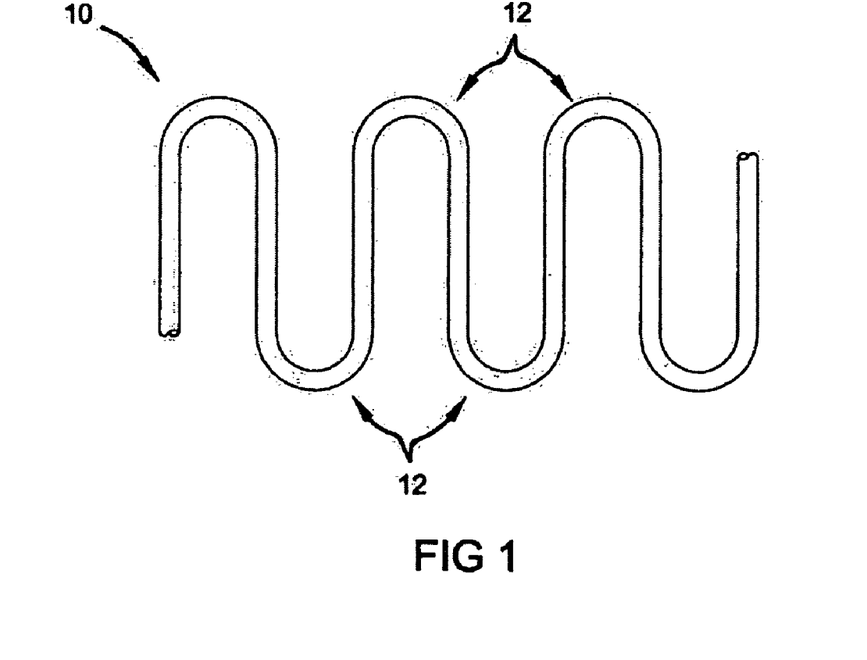
FIG. 1 is a partial plan view illustrating a flexible, tube shaped storage vessel in accordance with one embodiment of the present invention.

FIG. 1 illustrates one embodiment of the tube shaped high pressure storage tank, or vessel, generally referred by reference numeral 10. It is envisioned that the tube shaped vessel 10 according to the principles of the present invention can be formed or shaped to accommodate its placement in various areas of a vehicle, or other desired apparatus, where the use of a conventional cryogenic or compressed gas storage tank would not be feasible due to size, weight and space restrictions. In one aspect of the present invention, the tube shaped vessel 10 provides an equivalent amount of volumetric fuel storage at a similar or slightly increased weight as compared to the current technology, with the additional benefit of being flexible and adapted for placement in a more space efficient manner within a vehicle.

Figure 2:
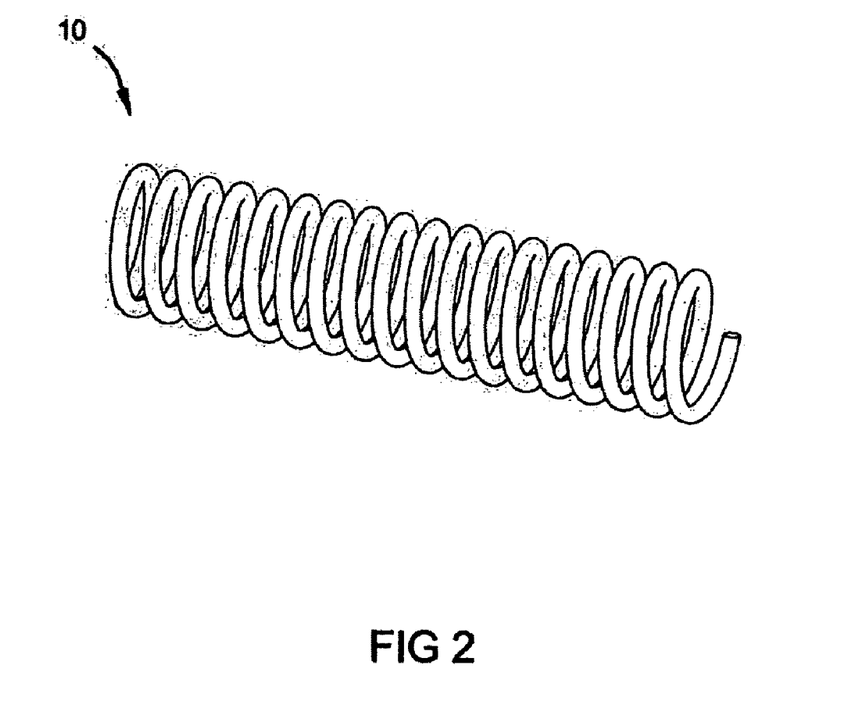
FIG. 2 is a perspective view illustrating a flexible, coil shaped storage vessel according to another embodiment of the present invention.
Figure 3A:
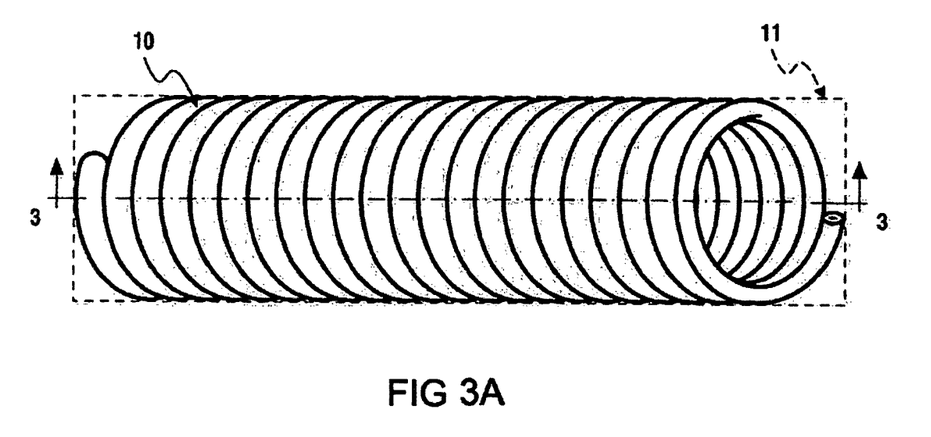
FIG. 3A is top plan view illustrating a coil shaped storage vessel disposed in a metal box.
Figure 3B:
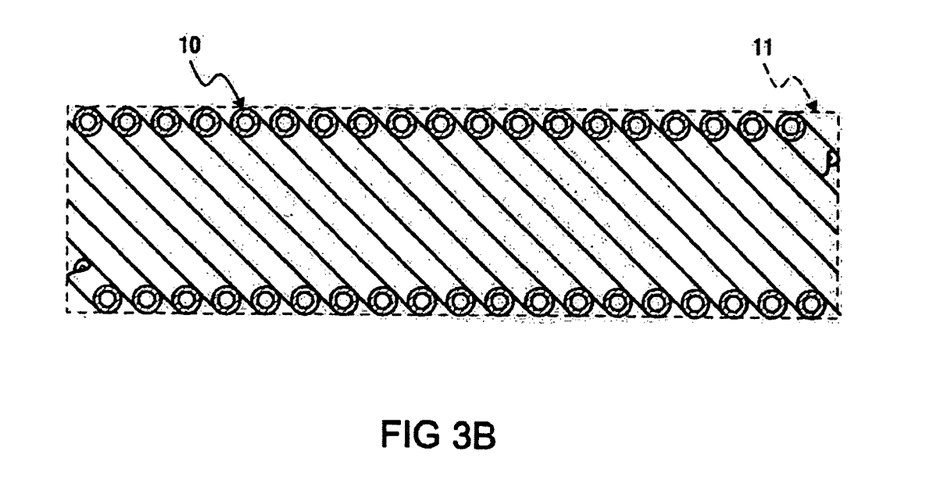
FIG. 3B is a cross-sectional view taken along the line 3-3 of FIG. 3A.

FIG. 1 depicts the vessel 10 having a plurality of bends 12, while FIG. 2 depicts a generally helically coiled shaped vessel 10. It should be noted that the shape and design of the vessel 10 can be varied to accommodate placement of the vessel 10 in almost any location, and all shapes and designs are with the scope of the present invention. For example, in one embodiment as illustrated in FIGS. 3A and 3B, it may be desirable to place the coiled vessel 10 in a box or container 11. FIG. 3A depicts a top view of a coiled vessel layered in a metal box 11 at a 45° angle, although the angle of placement may vary depending on the specific design. FIG. 3B is a cross-sectional view taken along the line 3-3 of FIG. 3A. In various embodiments, a plurality of storage vessels 10 may be used in combination. For example, they may be connected to one another, in series or in a parallel relationship, with suitable couplings or manifolds as desired.

Figure 4:
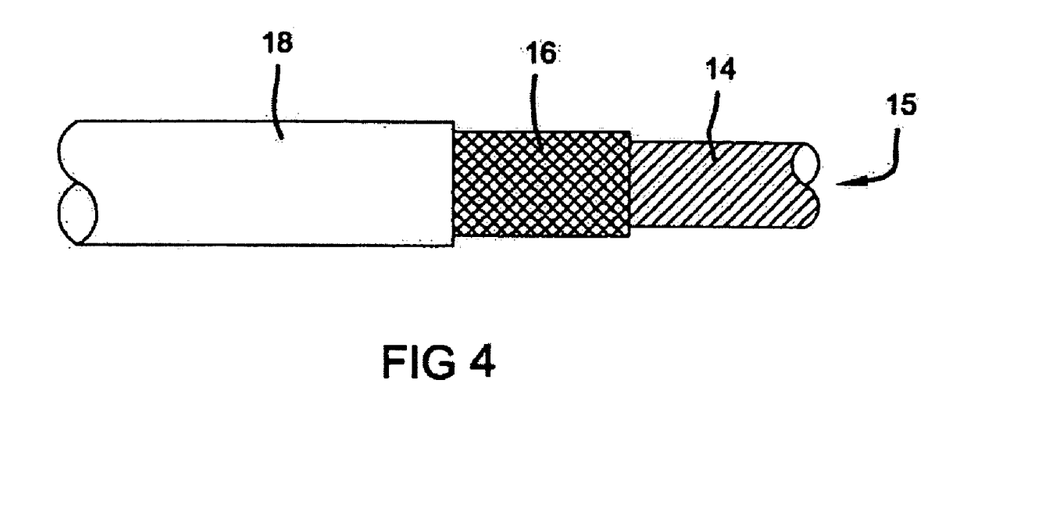
FIG. 4 is a magnified side view of the tubular storage vessel of FIG.'s 1 and 2, partially cut away and illustrating the layers of the vessel.

FIG. 4 is a magnified side view of the tubular storage vessel 10, partially cut away and illustrating the multilayer design. As depicted, the vessel 10 is of a concentric laminar construction, and preferably includes a flexible inner core member 14 defining a fluid-carrying channel 15, a flexible reinforcing material 16 surrounding the inner core member 14, and an outermost cover 18, each of which is described in further detail below. Preferably, the vessel 10 has an annular cross-section, however, it should be understood that it may be desirable to provide certain areas with a flat, rectangular, or other geometric shape for optimal placement and volume considerations.

Figure 5:
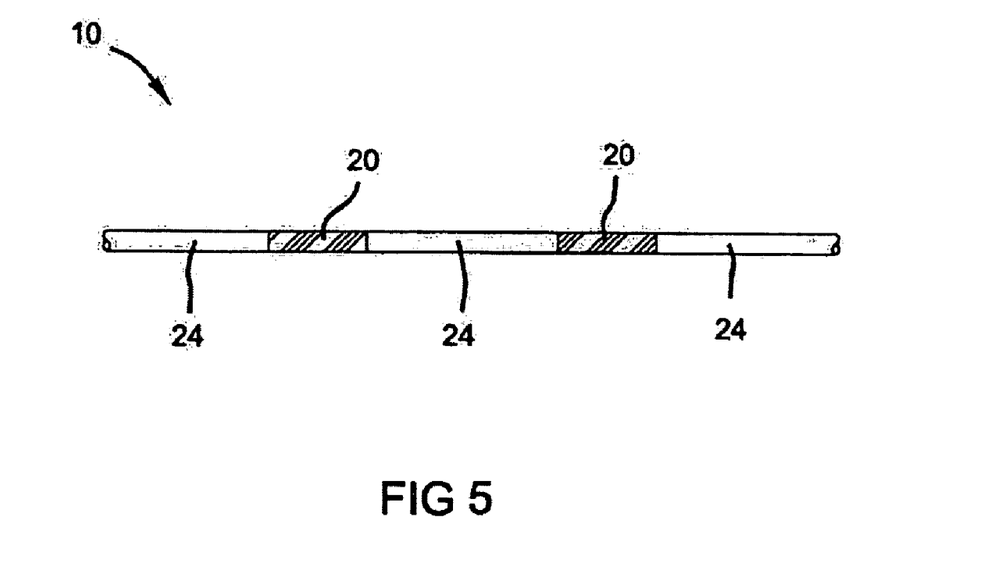
FIG. 5 is a partial plan view of tubular storage vessel prior to being shaped or formed and illustrating potential high stress zones.
Figure 6:
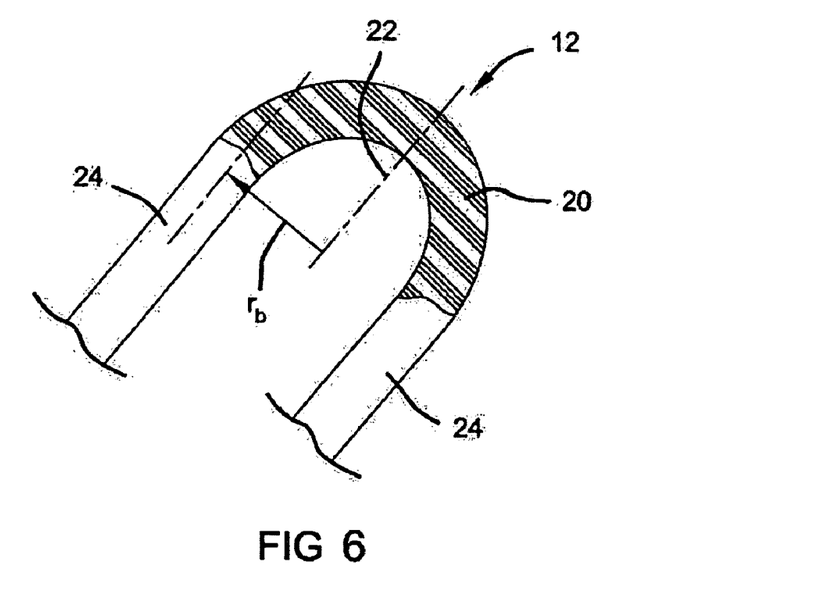
FIG. 6 is a partial magnified view illustrating one of the plurality of bends depicted in FIG. 1.

In various embodiments of the present invention, the overall shape of the storage vessel 10 is predetermined and designed having a plurality of bends 12 or curves for placement in a vehicle, or the like. FIG. 5 is a partial plan view of the storage vessel 10 as a linear member, prior to being shaped or formed. FIG. 5 illustrates potential high stress zones 20 which may occur where the vessel is bent or shaped. FIG. 6 is a partial magnified view illustrating one of the plurality of bends 12 as depicted in FIG. 1. In accordance with one aspect of the present invention, the vessel 10 is configured having a minimum bend radius from about 5 to about 50 mm, preferably the minimum bend radius is less than about 30 mm. In various embodiments, it is preferred to provide a minimum bend radius equal to our less than the outer diameter dimension, $d_o$, of the vessel, although these dimensions may vary depending upon specific applications. As used herein, the minimum bend radius, referenced by $r_b$, is defined as the distance between a central bend line 22 of the bent portion 12 and the center of the vessel. As shown, the minimum bend radius $r_b$ is measured along an angle normal to the center line 22. The minimum bend radius $r_b$ is typically determined by shaping the empty vessel over an angle greater than 180°, as shown in FIG. 6, and slowly reducing the size of the bend radius $r_b$ to as small as possible without kinking the vessel 10 so as to block the passage or channel 15 defined by the inner core 14.

Figure 7A:
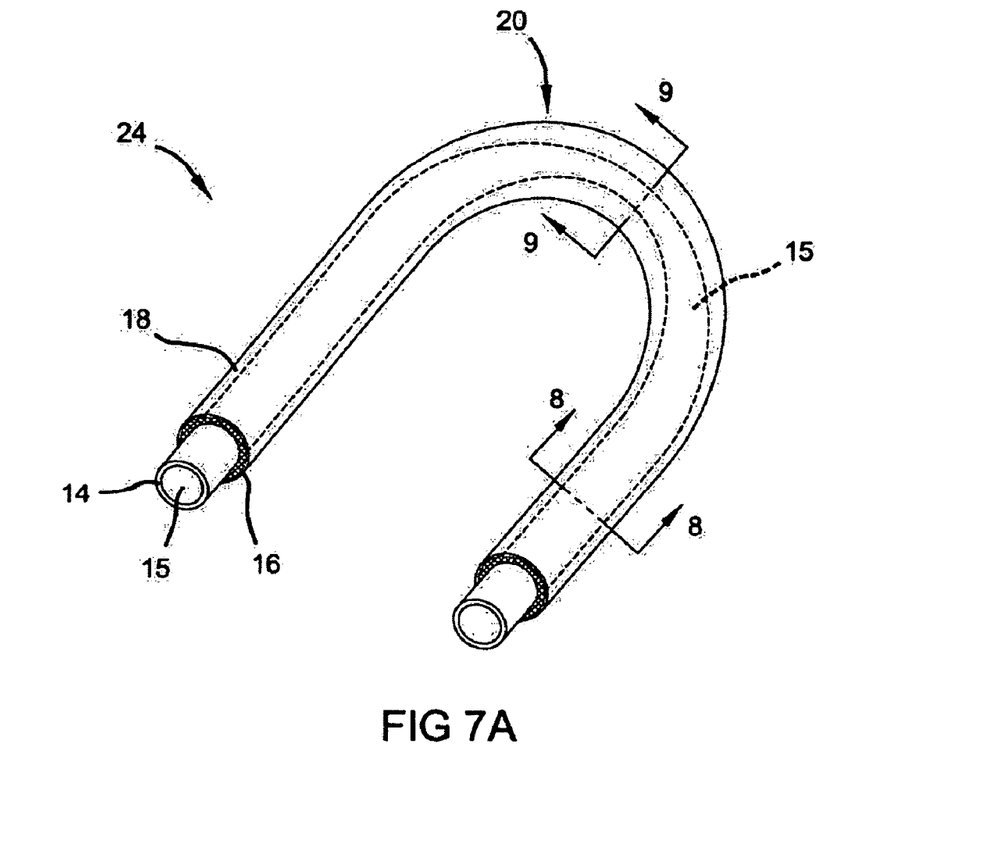
FIG. 7A is a partial magnified view illustrating a variable inner diameter at one of the plurality of bends depicted in FIG. 1.
Figure 7B:
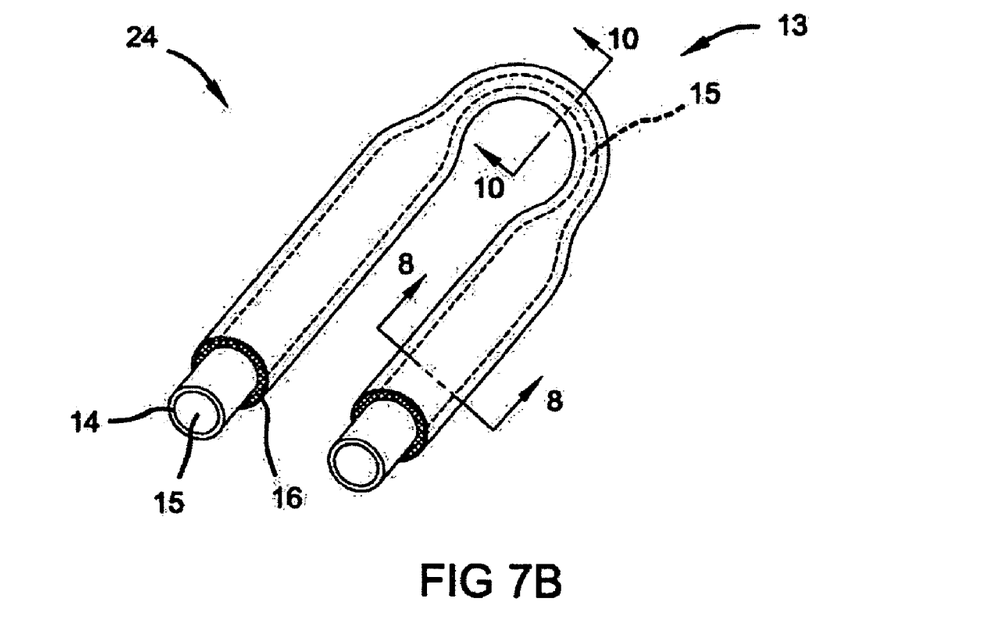
FIG. 7B is a partial magnified view illustrating an alternate embodiment having a variable outer diameter at one of the plurality of bends depicted in FIG. 1.

Numerous bends 12 may influence the structural integrity of the vessel 10. In various embodiments of the present invention, potential high stress zones or bend regions 20 proximal to the bends 12 of the vessel 10 are provided with extra reinforcement. In certain embodiments, the vessel 10 is also provided having a smaller inner diameter $d_i$ in the bend regions 20. FIG. 7A is a partial magnified view illustrating a variable or gradient inner diameter $d_i$ in addition to the presence of additional flexible reinforcing material 16 surrounding the inner core member 14 at the bend region 20. It should be noted that in certain embodiments, it may be desirable to provide areas having a smaller inner diameter $d_i$ without providing an increased amount of flexible reinforcement material 16. Likewise, it may also be desirable to provide areas having an increased amount of flexible reinforcement material 16 without decreasing the inner diameter $d_i$ (not shown). In various embodiments, the outer diameter $d_o$ remains constant along the entire length of the vessel 10. FIG. 7B illustrates an alternate embodiment having a variable outer diameter $d_o$. For example, the vessel 10 is provided with an area 13 having a smaller outer diameter $d_o$ to accommodate sharp folds or bends.

Figure 8:
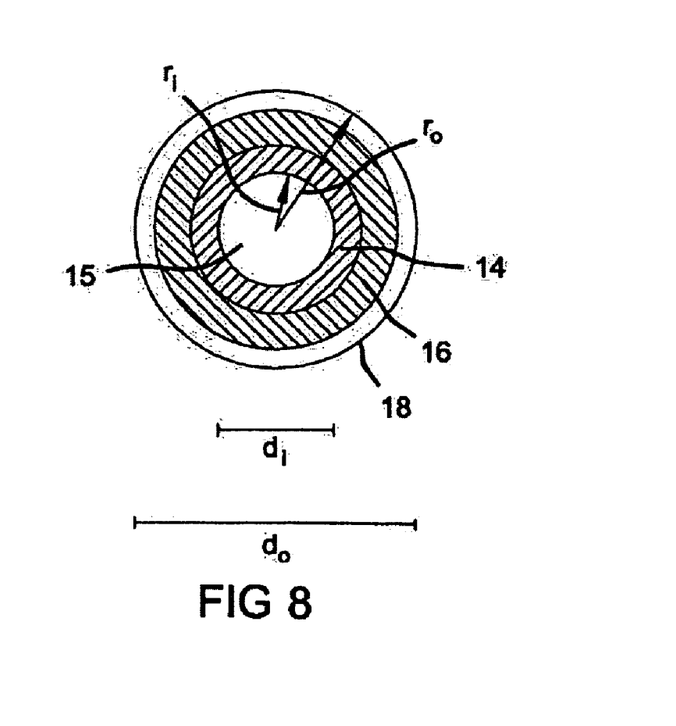
FIG. 8 is an enlarged cross-section view taken along the line 8-8 of FIGS. 7A and 7B.
Figure 9:
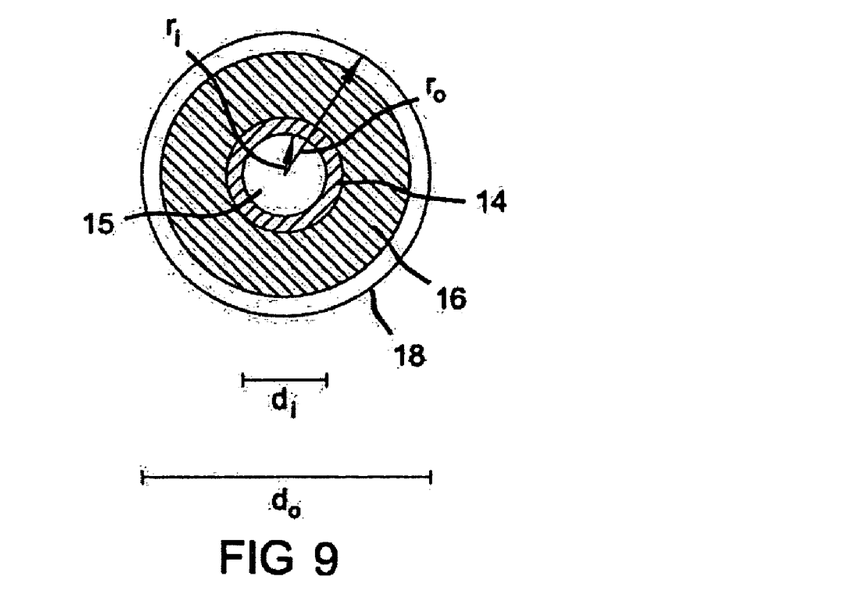
FIG. 9 is an enlarged cross-sectional view taken along the line 9-9 of FIG. 7A.
Figure 10:
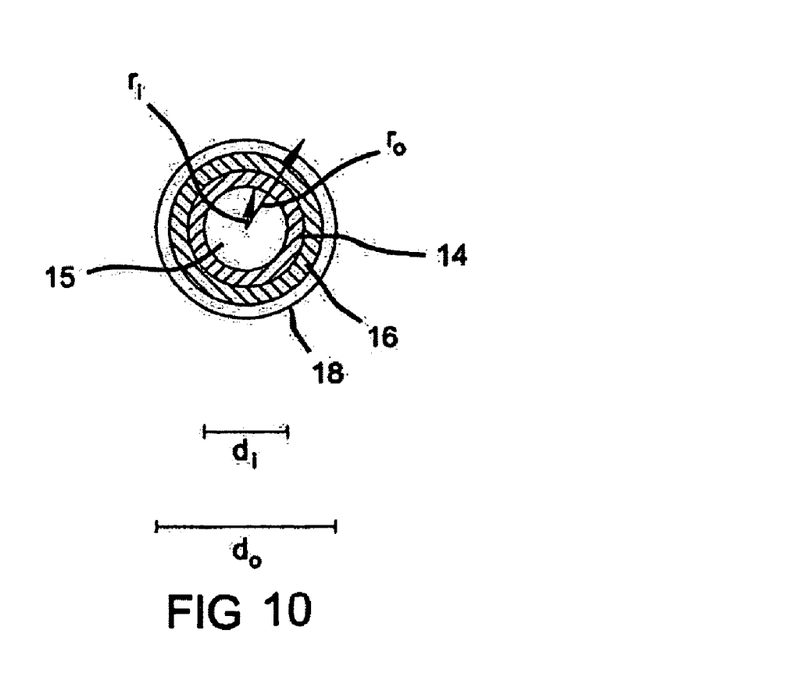
FIG. 10 is an enlarged cross-sectional view taken along the line 10-10 of FIG. 7B.

FIG. 8 is an enlarged cross-sectional view taken along the line 8-8 of FIGS. 7A and 7B and illustrates the internal structure and the inner diameter $d_i$ of an area 24 adjacent a bend region 20, as well as an inside radius $r_i$ of the inner core 14 and an outside radius $r_o$ of the outer protective wrapping 18. FIG. 9 is likewise an enlarged cross-sectional view taken along the line 9-9 of FIG. 7A, and illustrates a reduced inner diameter $d_i$ at the bend region 20 and an increased amount of flexible reinforcement material 16 circumferentially disposed about the inner core member 14. FIG. 10 is an enlarged cross-sectional view taken along the line 10-10 of FIG. 7B and illustrates a reduced outer diameter $d_o$ at the bend region 20 without any additional reinforcement material 16. Preferably, the inner diameter change is gradient, that is without sharp increases or decreases over a short distance of the vessel 10.

Preferably the tube shaped storage vessel 10 is configured to accommodate the storage and transport of a compressed gas, preferably hydrogen, at pressures from about 100 to about 900 bar, while maintaining a high degree of flexibility when a fluid or gas is not in the vessel 10. In various embodiments, the vessel 10 is designed with suitable structural integrity such that it is substantially non-deforming during use, with minimal volumetric expansion. In various preferred embodiments, the vessel 10 is able to reliably accommodate external operating temperatures typical of automobile use ranging from at least about −30° C. to at least about 65° C., or higher depending upon climates.

Inner Core Member

In various embodiments of the present invention, the inner tube, or inner core member 14 is formed of a flexible material having an annular cross section with an inner diameter $d_i$ defining a passage, or fluid-carrying channel 15 for storing and transporting a stored medium, such as a compressed gas. In various embodiments, the inner diameter $d_i$ is uniform throughout the vessel 10. In various other embodiments, the inner diameter $d_i$ has a variable length, based upon location. For example, in certain preferred embodiments and as illustrated in FIGS. 7-9, the bend regions 20 proximal to the bends 12 of the vessel 10, have a smaller inner diameter $d_i$ as compared to the inner diameter $d_i$ in areas 24 adjacent the bend regions 20. Preferably changes of the inner diameter size are gradient increases and decreases as opposed to sharp changes in diameter over a small length of the vessel 10.

The type of flexible material selected for this inner layer is suitably selected in accordance with the type of stored medium, for example, a compressed gas. Non-limiting examples of suitable flexible materials include high strength thermoplastic elastomers, polyolefin resins, polyvinyl chloride, polyamides, various rubbers, polyolefin elastomers, etc. For the purpose of recycling any fragments of the inner core member 14 produced during manufacture or recycling after use, preferred synthetic resins include polyolefin resins. Any material having suitable flexibility and strength may be used in conjunction with the invention. For example, if it is desired to form a vessel having increased rigidity, rigid polymers, such as polyvinylchloride and copolymers thereof, may be added with suitable plasticizers and modifiers present in effective amounts to create a desired flexibility as known within the ordinary skill in the art. The wall thickness of the inner core member 14 is properly selected to be as thin and lightweight as possible while being optimized to provide a sufficient gas barrier. For cost and safety reasons, the inner core member 14 should have a wall thickness configured to minimize, and preferably prevent and block, any gas permeation through the member 14 to the surrounding environment.

In various embodiments the inner core member 14 is formed of a plurality of synthetic resin layers. A multilayer inner core is typically manufactured from a multilayer extrusion process using a multilayered mold and a plurality of extruders. Alternatively, a multilayer inner core can be manufactured by extrusion-coating a pipe, for example, extrusion-forming a pipe with the use of an extruder and using a coating mold to then extrusion-coat the pipe. The pipe is then extrusion-coated as many times as desired. If the forming temperatures of the synthetic resins are not significantly different from one another, a multilayer extrusion process is preferred. A further alternative to forming a multilayer inner core includes surrounding the innermost tube with one or more heat-shrinkable synthetic resin tubes and securing or adhesively attaching the tubes to one another by heating.

Reinforcing Material

In various embodiments of the present invention, the inner core member 14 is surrounded by a flexible reinforcement material 16, or reinforcement wrapping. In various embodiments, the reinforcement material 16 is provided with a uniform thickness. In various other embodiments, the thickness is variable. For example, in certain preferred embodiments and as illustrated in FIGS. 7-9, the bend regions 20 proximal to the bends 12 of the vessel 10, have a greater amount of flexible reinforcement 16 surrounding the inner core 14 than in areas 24 adjacent the bend regions 20. Preferably, the flexible reinforcing material 16 is provided in an amount sufficient to absorb expansive forces acting in both the radial and longitudinal directions of the vessel. The reinforcing material 16 can be provided as a reinforcing sheath layer, or it can be wrapped or wound around the inner core member 14 as known by one skilled in the art. In various embodiments, the internal operating pressure may vary between about 100 to about 900 bar as previously discussed. It should be noted that the flexible reinforcement material 16 is preferably configured to provide a suitable burst strength of about 2 to 3 times the typical operating pressure.

In various embodiments, the flexible reinforcing material 16 is selected from the group consisting of high tensile strength aromatic polyamide fibers, carbon fibers, nylon fibers, and mixtures thereof. The flexible reinforcement material 16 preferably comprises one of a high-strength fiber, a high-strength fiber in a polymer composite matrix, and a high-strength fiber in a metal matrix. While metals are presently not most desirable due to the increased weight, a high-strength metallic band, or a high-strength metallic wire may optionally be used in certain areas of the vessel. Non-limiting examples of high-strength fibers used for the reinforcement material 16 include a high-strength carbon fiber (such as MAGNAMITE® IM7, TORAY® T1000), glass fiber (such as S-2®), aramid fiber (such as KEVLAR®), PBO fiber (such as ZYLON®), or liquid crystal fiber (for example VECTRAN® HS).

The flexible reinforcement material 16 may also comprise any and all grades of organic and inorganic fibers. Non-limiting examples of inorganic fibers include E glass and S2 glass and other high silica fibers, quartz, boron, silicon carbide, silicon nitride, alumina, and titanium carbide. Other materials for reinforcement material 16 include any and all pitch- and polyacrylonitrile (PAN)-based carbon fibers including standard modulus grades, intermediate modulus grades, high modulus grades, ultra-high modulus grades, and ultra-high strength include any and all grades of aramid, meta-aramid, and para-aramid fiber, for grades (e.g. TORAY® T1000). Still other materials for the reinforcement material 16 example KEVLAR® 29, 129, 49, and KM2. Additionally, any and all grades of other polymeric fibers, such as, SPECTRA® fiber 900, SPECTRA® 1000, polyphenylene sulfide, polyetheretherketone, VECTRAN® HS, VECTRAN® M, polyimide, polyetherimide, and polyamideimide. Also, any and all grades of polybenzimidazole-based fiber, including ZYLON®-AS and ZYLON®-HM can be used. Where desired, any and all grades of metallic banding, wire, or fiber, including steel alloys, aluminum alloys, and titanium alloys can also be used, subject to the additional weight.

Where the reinforcement material 16 includes a composite material, the binding matrix may include any and all grades of thermosetting and thermoplastic polymers. Some examples include epoxy, polyester, vinyl ester, polyurethane, silicone, butyl rubber, phenolic, polyimide, bismaleimide, cyanate ester, polyetheretherketone, polyphenylenesulfide, polysulfone, polyethylene, polypropylene, polycarbonate, polyetherimide, polyethylenesulfide, acrylic, acylonitrile butadiene styrene, and nylon.

Outer Barrier Layer

In order to protect the inner core member 14 and the reinforcing layer 16 from external forces, the high-pressure storage vessel 10 of the present invention is preferably laminated or surrounded by a protective wrapping, or outer layer 18 defining an outer diameter $d_o$. The outer layer 18 may include a plurality of polymers, rubbers, and synthetic resins. The outer layer 18 may be the same as or different from the resin material used for the inner core member 14. Depending upon the specific use, the flexible storage vessel 10 may likely be exposed to a broad range of chemical agents, including gasoline, fuel oil, hydraulic fluid, and the like. Preferably, the outer layer 18 prevents the ingress of water or fluids into the storage vessel, while further preventing the discharge of any compressed gas that may try to escape from the vessel if the inner core member 14 is compromised. In addition to fluid protection, the outer layer 18 further provides physical protection and is preferably heat and fire resistant, in addition to being abrasion resistant. In certain embodiments of the invention, the storage vessel 10 is mounted inside a box 11 (i.e., a metal box) as illustrated in FIGS. 3A and 3B. In this and other embodiments, it may not be necessary to provide an outer layer 18. The outer diameter, $d_o$, is then defined by the reinforcement layer 16.

One example of the outer layer 18 formation includes lamination by extrusion forming. In order to achieve firm adhesion between the outer layer 18 and the reinforcing material 16, an adhesive layer may optionally be co-extruded with the outer layer 18. Preferably, there is an adhesive strength sufficient to prevent separation between the outer layer 18 and the reinforcing material 16 when the vessel is shaped or bent. In other embodiments, a heat-sealable resin film having a proper thickness may be laminated onto the exterior of the high pressure storage vessel. In various embodiments, the outer layer may be marked or provided with ribs or other visible means to indicate bend areas 12 or the like.

Methods

The present invention also provides various methods for storing and transporting a compressed gas. In one embodiment, a method of storing and delivering hydrogen fuel to a power generating device, such as a fuel cell for use in a motor vehicle, is disclosed. One such method includes providing a flexible, high pressure, tubular storage vessel 10. The storage vessel 10 includes an inner core member 14 defining a fluid carrying channel 15 and a flexible reinforcing material 16 circumferentially disposed about the inner core member 14.

The size and flexible nature or the storage vessel 10 allows it to be shaped for placement in various locations of a motor vehicle or the like. For example, the storage vessel 10 may be formed, shaped, or wrapped by bending, coiling, or other suitable means for placement in a motor vehicle.

As a result of the manufacturing process, a fitting device or a valve assembly is used on each side of the storage tube. In certain embodiments, the compressed gas enters one end of the vessel and is discharged through the opposite end. In other embodiments, the fitting or valve assembly is configured to both receive and selectively dispense or discharge the compressed gas. The tubular storage vessel is filled with hydrogen gas, preferably charged to an operating pressure from about 100 to about 900 bar, depending upon the desired use. The compressed hydrogen gas is then selectively released for use in the power generating device.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flexible, high pressure, tubular storage vessel for storing and dispensing a compressed gas, the vessel shaped having a plurality of bends and comprising:
    a gas impermeable inner core member comprising a flexible material and defining an inner diameter of a fluid-carrying channel adapted to store the compressed gas; and
    a flexible reinforcing material circumferentially disposed about said inner core member,
    wherein the vessel comprises bend regions proximal to said bends, said bend regions having a greater amount of said flexible reinforcing material surrounding said inner core than areas adjacent said bend regions,
    further wherein said flexible reinforcing material is surrounded by a protective wrapping defining a uniform outer diameter.

2. A storage vessel according to claim 1, wherein said flexible reinforcing material has a variable thickness.

3. A storage vessel according to claim 1, wherein said inner diameter of said inner core member is variable.

4. A storage vessel according to claim 3, wherein said bend regions have an inner diameter smaller than an inner diameter adjacent said bend regions.

5. A storage vessel according to claim 1, comprising a minimum bend radius from about 5 to about 50 mm.

6. A storage vessel according to claim 1, wherein said flexible reinforcing material is selected from the group consisting of high tensile strength aromatic polyamide fibers, carbon fibers, nylon fibers and mixtures thereof.

7. A storage vessel according to claim 1, further comprising a valve assembly disposed at one end of said vessel operable to both receive and dispense the compressed gas.

8. A tube shaped storage vessel adapted to store hydrogen fuel for use with a power generating device, the vessel comprising:
    an inner tube comprising a flexible material and defining an inner diameter of a fluid-carrying channel adapted to store hydrogen fuel; and
    a flexible reinforcing material circumferentially disposed about said inner tube and defining an outer diameter, said flexible reinforcing material having a variable thickness, wherein said outer diameter is uniform and the vessel is configured to be shaped into a pattern.

9. A tube shaped storage vessel according to claim 8, wherein the vessel is shaped having a plurality of bends, the vessel further comprising bend regions proximal to said bends, said bend regions having a greater amount of said flexible reinforcing material surrounding said inner tube than areas adjacent said bend regions.

10. A tube shaped storage vessel according to claim 8, wherein said inner diameter is variable along said inner tube.

11. A tube shaped storage vessel according to claim 10, wherein the vessel is shaped having a plurality of bends, the vessel further comprising bend regions proximal to said bends, said bend regions having an inner diameter smaller than an inner diameter adjacent said bend regions.

12. A tube shaped storage vessel according to claim 8, wherein said flexible reinforcing material is surrounded by a wrapping, said wrapping defining said outer diameter.

13. A tube shaped storage vessel according to claim 8, wherein said flexible reinforcing material is selected from the group consisting of high tensile strength aromatic polyamide fibers, carbon fibers, nylon fibers and mixtures thereof.

14. A tube shaped storage vessel according to claim 8, wherein the vessel is configured to be shaped having a minimum bend radius from about 5 and about 50 mm.

15. A tube shaped storage vessel according to claim 8, having an overall hydrogen capacity of from about 0.5 to about 10 kg of hydrogen gas at operating pressures from about 100 to about 900 bar.

16. A tube shaped storage vessel according to claim 8, wherein the vessel is coiled and configured for placement in a box shaped container.

17. A tube shaped storage vessel adapted to store hydrogen fuel for use with a power generating device, the vessel comprising:
    an inner tube comprising a flexible material and defining an inner diameter of a fluid-carrying channel adapted to store hydrogen fuel;

a flexible reinforcing material circumferentially disposed about said inner tube and having a variable thickness; and a protective wrapping layer circumferentially disposed about said flexible reinforcing material and defining an outer diameter, wherein said inner diameter is variable along said inner tube and said outer diameter is uniform.

18. A tube shaped storage vessel according to claim 17, wherein the vessel is shaped having a plurality of bends, the vessel further comprising bend regions proximal to said bends, said bend regions having an inner diameter smaller than an inner diameter adjacent said bend regions.

19. A tube shaped storage vessel adapted to store hydrogen fuel for use with a power generating device, the vessel comprising:

an inner tube comprising a flexible material and defining an inner diameter of a fluid-carrying channel adapted to store hydrogen fuel, said inner diameter being variable along said inner tube;

a flexible reinforcing material circumferentially disposed about said inner tube; and a protective wrapping layer circumferentially disposed about said flexible reinforcing material and defining a uniform outer diameter, wherein the vessel is shaped having a plurality of bends, the vessel further comprising bend regions proximal to said bends, said bend regions having an inner diameter smaller than an inner diameter adjacent said bend regions.

\* \* \* \* \*